July 19, 1960  H. M. STEELE, JR  2,946,031
PRESSURE TRANSDUCER
Filed May 5, 1958
2 Sheets-Sheet 1
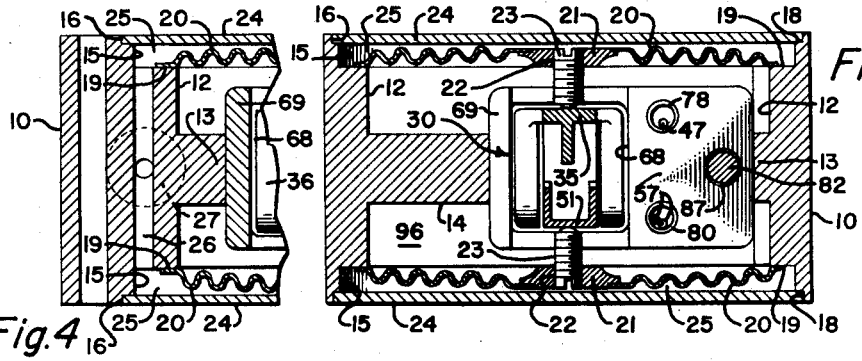
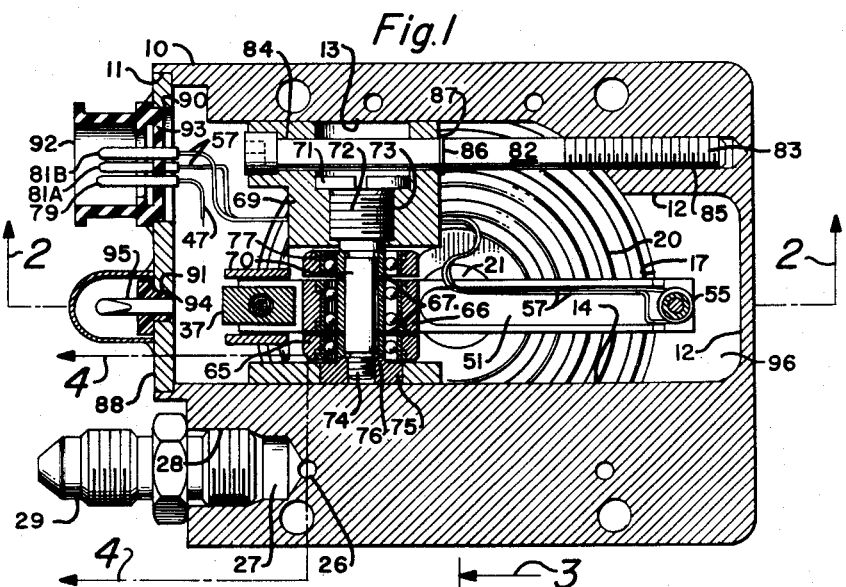
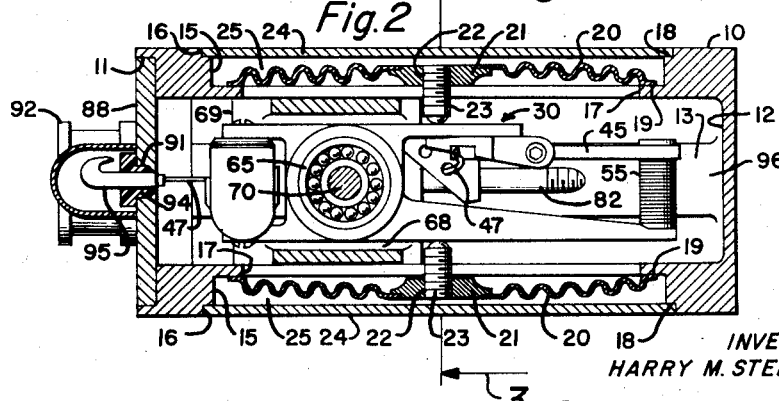
INVENTOR
HARRY M. STEELE JR.
BY
ATTORNEY

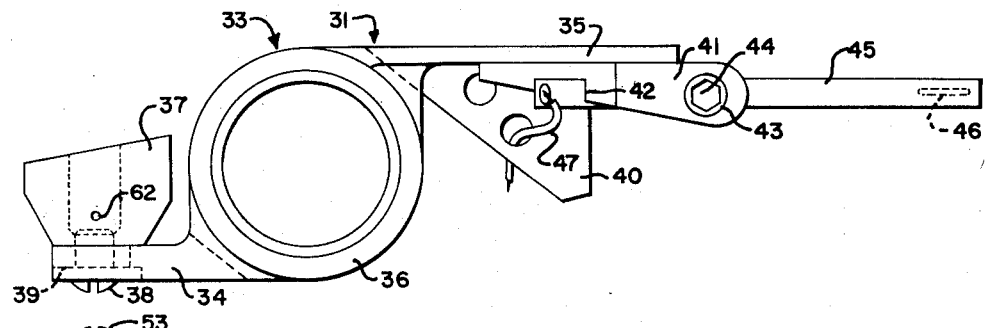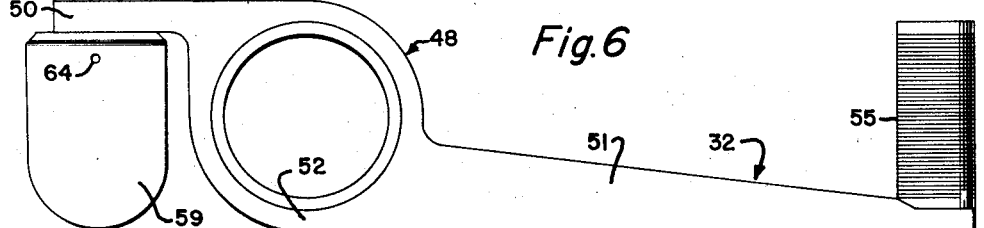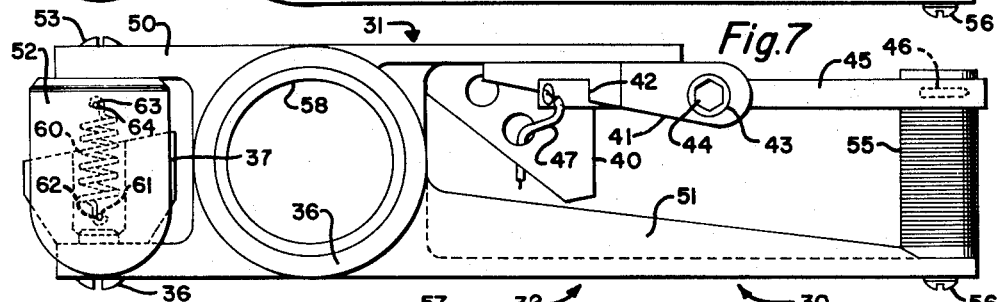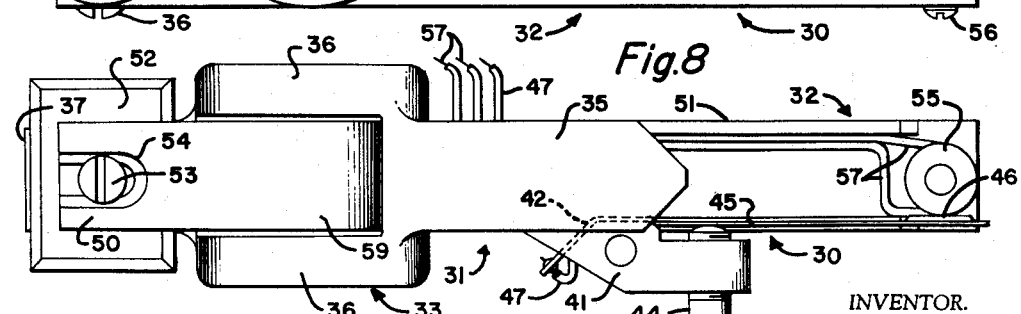

United States Patent Office 2,946,031
Patented July 19, 1960

2,946,031
PRESSURE TRANSDUCER

Harry M. Steele, Jr., Phoenix, Ariz., assignor to The Garrett Corporation, Los Angeles, Calif., a corporation of California Filed May 5, 1958, Ser. No. 733,146

15 Claims. (Cl. 338—42)

This invention relates to measuring instruments, and more particularly to pressure transducers for converting fluid pressure values into an electrical signal.

It is an object of the present invention to provide a pressure sensitive instrument that will perform reliably and accurately at low pressures.

It is also an object of the present invention to provide a very sensitive pressure transducer capable of giving accurate pressure readings under extreme conditions of vibration and mechanical shock.

A further object of the present invention is to provide a unique, counterbalanced mechanical motion-amplifying means, in a transducer, which is unaffected by extreme acceleration and mechanical shock.

These and other objects and advantages of this invention will become apparent from a reading of the attached description, together with the drawings, wherein:

Figure 1 is a longitudinal sectional view of a fluid pressure transducer constructed in accordance with the present invention;

Fig. 2 is a longitudinal sectional view, of the fluid pressure transducer shown in Fig. 1, taken on line 2—2 of Fig. 1;

Fig. 3 is a transverse cross-sectional view taken on line 3—3 of Fig. 2;

Fig. 4 is a fragmentary sectional view taken on line 4—4 of Fig. 1;

Fig. 5 is a view, in side eelvation, of the wiper component of the composite motion transmitting-means and potentiometer element;

Fig. 6 is a view, in side elevation, of the resistor component of the composite motion-transmitting means and potentiometer element;

Fig. 7 is a side elevational view of the assembled motion-transmitting means and potentiometer element; and Fig. 8 is a plan view of the assembled motion-transmitting means and potentiometer element.

By reference to the drawings, it will be seen that one embodiment of the present invention comprises a rectangular block-shaped housing 10, which is formed to include a longitudinally extending cavity having an opening 11 and being defined by a U-shaped wall 12. A pair of parallel longitudinally directed carriage guides 13 and 14 project from opposite sides of the wall 12. The housing 10 also contains two coaxially situated circular openings 15 disposed at opposite sides of the housing 10. Each of the openings 15 is provided with an enlarged diameter 16 and a reduced diameter 17 to form annular ledges 18 and 19, respectively. A set of diaphragms 20 are disposed in openings 15 at opposite sides of the housing 10 and soldered, brazed or otherwise joined in fluid-tight relation to ledges 19. The central portion of each diaphragm 20 consists of a nut 21 having a screw-threaded opening 22 to receive an adjustment screw 23. The screws 23 are threaded into each of the nuts 22 so as to be directed inwardly toward the center of housing 10. A pair of caps 24, which are in the form of flat circular disks, are abutted against the ledge 18 and soldered, brazed, or otherwise attached in fluid-sealing relation to the housing 10. The caps 24, diaphragms 20, and housing 10 are thereby cooperatively disposed to enclose opposing pressure chambers 25, which are interconnected by a transverse fluid conducting passage 26. Passage 26 communicates with a passage 27 which extends inwardly in a longitudinal direction from one end of housing 10. Passage 27 is provided with a suitable screw-threaded bore 28 to receive a fitting 29, which forms a means for attachment to any desired external fluid pressure source to be measured.

By reference to Figs. 7 and 8 of the drawings, it will be seen that a composite motion-transmitting means and potentiometer element, indicated generally by the numeral 30, comprises two subassemblies, one of which may be termed the wiper component 31, and the other may be termed the resistor component 32. For the sake of clarity, the wiper component 31 is shown separately at Fig. 5, and the resistor component 32 is shown separately at Fig. 6.

By reference to Fig. 5, it will be seen that the wiper component 31 comprises a rocker element 33 consisting of beams 34 and 35 which extend tangentially in opposite directions from a pair of spaced, coaxially disposed annular elements 36. Beam 34 is provided to support a counterweight 37 attached thereto by means of a screw 38 which extends through an adjustment slot 39. Beam 35 is disposed diametrically opposite beam 34 on the annular elements 36 and is formed to include a stop 40. A support 41, formed of plastic, resin, or any other suitable dielectric material, is cemented or otherwise attached to beam 35. The support 41 contains a slot 42 and a screw-threaded bore 43. An adjustment screw 44 is engaged in bore 43 and a wiper arm 45, which is in the form of a thin, resilient metal band provided with a contact lug 46, is cemented into slot 42. A length of flexible, insulated electrical wire or cable 47 is soldered to the end of arm 45 opposite lug 46 and extends therefrom through one of the openings in the stop 40. The cable 47 is thereafter carried to a position which will be further described later in this specification.

By reference to Fig. 6, it will be seen that the resistor component 32, of the composite motion-amplifying means and potentiometer element, comprises a rocker element 48 consisting of a pair of beams 50 and 51 which extend tangentially in opposite directions from a common annular element 52. Beam 50 is provided to support a U-shaped counterweight 59 attached thereto by a screw 53 which extends through an adjustment slot 54. Beam 51 is disposed diametrically opposite beam 50 on the annular element 52 and is provided to support an electrical resistor element 55. The resistor 55 is attached to beam 51 by a screw 56. A pair of flexible, insulated electrical wires or cables 57 lead to and from the resistor element 55, and a length of each of these cables 57 is disposed along one side of beam 51, being attached thereto by cement. The cables 57 are thereafter carried to a position to be described later in this specification.

Beam 51 of the resistor component 32 is inserted through the space between the annular elements 36, of the wiper component 31, so that the annular elements 36 and 52 are disposed in coaxial alignment and the internal surfaces thereof define a common cylindrical opening 58. The beams 35 and 51 are positioned substantially parallel to each other so that lug 46 may be brought into positive contact with the resistor 55 by means of the adjustment screw 44. A tension spring 60 is disposed between beams 34 and 50 and is held in position by a pin 61, which is inserted in opening 62 provided in counterweight 37, and a pin 63, which is inserted in opening 64 provided in counterweight 52.

A set of antifriction bearing 65 and 66 are disposed in the opening 58 of the annular elements 36 and 52, respectively. Bearings 65 and 66 are separated by a plurality of shim washers 67. The composite motion-transmitting means and potentiometer element 30 thus assembled is positioned in an opening 68 provided in a carriage 69 and journaled on a shaft 70 of a bolt 71. One end 72 of bolt 71 is engaged in a screw-threaded bore 73 of carriage 69 and the other end 74 of bolt 71 is engaged by screw-thread means to a nut 75. It will be noted that by tightening nut 75, the inner races of bearings 65 and 66 are clamped between the annular projection 76, on nut 75, and the shoulder 77, of bolt 71, and are thereby restrained against rotation about shaft 70.

The cable 47 extends from the opening in stop 40 through an opening 78 in the carriage 69 and therefrom to a terminal pin 79. The cables 57 extend from the beam 51 through an opening 80 in carriage 69, thereafter to be separated so that one end is attached to terminal pin 81A and the other end is attached to terminal pin 81B.

Both the composite motion-transmitting means 30 and the carriage 69 are positioned in the cavity provided in the housing 10, so that the beams 35 and 51 are disposed between the adjustment screws 23 and the carriage 69 is slidably positioned between the projecting guides 13 and 14. An adjustment screw 82, which is provided with a threaded end 83, extends through a bore 84 in the carriage 69 to be engaged in threaded bore 85 formed in housing 10. The screw 78 is also formed to include an annular groove 86, which receives a "snap-ring" 87 provided to prevent back and forth movement of the carriage relative to screw 78. The distance between the pivotal axis of the rocker elements 33 and 48 and the point of force, which is applied to beams 35 and 51 by the ends of the screws 23, may be varied by turning screw 82. Any desired leverage ratio may be obtained, therefore, within the design limits of the device.

A rectangular end cover 88 is located in the opening 11 and soldered, brazed, or otherwise attached to the housing 10. The end cover 88 contains two circular openings 90 and 91, respectively. The opening 90 is provided to receive an electrical plug housing 92, which is formed of any suitable dielectric material. The terminal pins 79, 81A, and 81B extend through the end 93 of housing 92 and may be connected to any suitable electrical signal measuring instrument and electrical power source. The opening 91 is provided to receive a plastic plug 94 which contains a hollow tube 95. The end cover 88 and its associated parts are thus disposed in cooperative relation to the housing 10 and diaphragms 20 to enclose a reference pressure chamber 96. All possible places of leakage, such as the junctures associated with cover 88, are sealed by a suitable sealing compound, and the fluid existing in chamber 96 is evacuated therefrom through the tube 95. After chamber 96 is evacuated, the tube 95 is closed and a metal cap 97 is cemented thereover to prevent damage to tube 95.

It will be noted that the rocker elements 33 and 48 are independently balanced relative to a coincident pivotal axis, and are restricted to planar rotational movement around this fixed axis. It is evident, therefore, that any external force affecting the movement of the rocker elements 33 and 48 must have a component parallel to their plane of rotation, and if this force is mechanical shock or vibration, for example, it will act in the same direction and magnitude on each of the opposed balanced masses. The pivoted connection between two balanced masses will, therefore, prevent any movement of these masses, and substantial immunity from shock or vibration will be gained. It will necessarily follow that the only force affecting the movement of rocker elements 33 and 48 must be confined to one side of the rocker element in order to cause movement thereof, and this is obtained in this instance by transmitting the fluid pressure force in chambers 25 through the diaphragms 20 and screws 23 to beams 35 and 51.

Operation of the present device is initiated by connecting the terminal pins 79, 81A, and 81B with an external electrical signal-measuring instrument and an electrical power source, and by connecting fitting 29 with an external fluid pressure source. Fluid under pressure, upon entering passage 27, will be directed through passage 26 to the opposed pressure chambers 25. A pressure increase in chambers 25 will urge diaphragm 20 and screws 23 toward the center of the chamber 96. This convergence of screws 23 will cause them to bear on beams 35 and 51, and through the pivotal action of rocker elements 33 and 48, move the contact lug 46 along the windings on resistor 55. Any change in position of contact lug 46, relative to the resistor 55, will result in a change in the resistance capacity of the potentiometer and, consequently, a difference in the reading on any electrical signal-measuring device connected thereto. The electrical signal-measuring device may, for example, be calibrated in any one of the conventional units of fluid pressure measure. If the pressure in chambers 25 is decreased, the tension spring 60 will tend to spread beams 35 and 91 and return all movable parts of the transducer to their original position.

I claim:

1. A fluid pressure transducer comprising: a housing; a set of movable walls disposed in said housing and cooperating therewith to define a pair of fluid pressure chambers; reference means to oppose the pressure actuated movement of said movable walls; passage means to establish communication between said fluid pressure chambers and connect them with a source of fluid pressure to be measured; movable signal-producing means disposed in said housing; and motion-transmitting means engaged by said movable walls and actuated by movement thereof to operate said movable signal-producing means.

2. A fluid pressure transducer comprising: a housing; a set of movable walls disposed in said housing and cooperating therewith to define a pair of fluid pressure chambers; reference means to oppose the pressure actuated movement of said movable walls; passage means to establish communication between said fluid pressure chambers and connect them with a source of fluid pressure to be measured; variable resistance signal-producing means; and a motion-transmitting means disposed in said housing in engagement with said movable wall means and actuated by movement thereof to operate said signal-producing means.

3. A fluid pressure transducer comprising: a housing; a set of movable walls disposed in said housing and cooperating therewith to define a pair of fluid pressure chambers; reference means to oppose the pressure actuated movement of said movable walls; passage means to establish communication between said fluid pressure chambers and connect them with a source of fluid pressure to be measured; variable electrical current-controlling means for producing an electrical signal; and a motion-transmitting means disposed in said housing in engagement with said movable walls and actuated by movement thereof to operate said electrical current-controlling means.

4. A fluid pressure transducer comprising: a housing; a set of movable walls disposed in said housing and cooperating therewith to define a pair of fluid pressure chambers; reference means to oppose the pressure actuated movement of said movable walls; passage means to establish communication between said fluid pressure chambers and connect them with a source of fluid pressure to be measured; variable electrical resistance means for producing a signal; and motion-transmitting means disposed in said housing in engagement with said movable walls and actuated by movement thereof to operate said electrical resistance means.

5. A fluid pressure transducer comprising: a housing; a set of movable walls disposed in said housing and cooperating therewith to define a pair of fluid pressure chambers; reference means to oppose the pressure actuated movement of said movable walls; passage means to establish communication between said fluid pressure chambers and connect them with a source of fluid pressure to be measured; potentiometer means for producing a variable signal; and motion-transmitting means disposed in said housing for engagement with said movable walls and actuated by movement thereof to operate said potentiometer means.

6. A fluid pressure transducer comprising: a housing; a set of movable walls disposed in said housing and cooperating therewith to define a pair of fluid pressure chambers; reference means to oppose the pressure actuated movement of said movable walls; passage means to establish communication between said fluid pressure chambers and connect them with a source of pressure to be measured; movable signal-producing means disposed in said housing; and counterbalanced, pivoted, motion-transmitting means engaged by said movable walls and actuated by movement thereof to operate said movable signal-producing means.

7. A fluid pressure transducer comprising: a housing; a set of movable walls disposed in said housing and cooperating therewith to define a pair of fluid pressure chambers; reference means to oppose the pressure actuated movement of said movable walls; passage means to establish communication between said fluid pressure chambers and connect them with a source of fluid pressure to be measured; variable resistance signal-producing means; and counterbalanced, pivoted, motion-transmitting means disposed in said housing in engagement with said movable walls and actuated by movement thereof to operate said signal-producing means.

8. A fluid pressure transducer comprising: a housing; a set of movable walls disposed in said housing and cooperating therewith to define a pair of fluid pressure chambers; reference means to oppose the pressure actuated movement of said movable walls; passage means to establish communication between said fluid pressure chambers and connect them with a source of fluid pressure to be measured; variable electrical current-controlling means for producing a signal; and counterbalanced, pivoted, motion-transmitting means disposed in said housing in engagement with said movable walls and actuated by movement thereof to operate said current-controlling means.

9. A fluid pressure transducer comprising: a housing; a set fo movable walls disposed in said housing and cooperating therewith to define a pair of opposed fluid pressure chambers and a thermally insensitive space therebetween; reference means to oppose the pressure actuated movement of said movable walls; passage means to establish communication between said fluid pressure chambers and a source of fluid pressure to be measure; electrical, variable resistance means for producing a signal; and counterbalanced, pivoted, motion-transmitting means disposed in said housing in engagement with said movable walls and actuated by movement thereof to operate said electrical, variable resistance means.

10. A fluid pressure transducer comprising: a housing; a set of movable walls disposed in said housing and cooperating therewith to define a pair of opposed fluid pressure chambers and a thermally insensitive space therebetween; reference means to oppose the pressure actuated movement of said movable walls; passage means to establish communication between said fluid pressure chambers and a source of fluid pressure to be measured; potentiometer means for producing a signal; and counterbalanced, pivoted, motion-transmitting means disposed in said housing in engagement with said movable walls and actuated by the movement thereof to operate said potentiometer means.

11. A fluid pressure transducer comprising: a housing; a set of movable walls disposed in said housing and cooperating therewith to define a pair of opposed fluid pressure chambers and a thermally insensitive space therebetween; reference means to oppose the pressure actuated movement of said movable walls; passage means to establish communication between said fluid pressure chambers and a source of fluid pressure to be measured; movable signal-producing means; and a motion-transmitting means consisting of a pair of opposed, counterbalanced, coaxially pivoted rockers, said rockers being disposed in said housing to be engaged by said movable walls and actuated by movement thereof to operate said movable signal-producing means.

12. A fluid pressure transducer comprising: a housing; a set of movable walls disposed in said housing and cooperating therewith to define a pair of fluid pressure chambers at opposite sides of a reference pressure chamber; a passage means to establish communication between said fluid pressure chambers and a source of fluid pressure to be measured; a variable resistance, signal-producing means; and a motion-transmitting means consisting of a pair of opposed, counterbalanced, coaxially pivoted rockers, said rockers being disposed in said housing to be engaged by said movable walls and actuated by movement thereof of operate said signal-producing means.

13. A fluid pressure transducer comprising: a housing; a set of movable walls disposed in said housing and cooperating therewith to define a pair of fluid pressure chambers at opposite sides of a reference pressure chamber; a passage means to establish communication between said fluid pressure chambers and a source of fluid pressure to be measured; a variable, electrical current-controlling means for producing a signal; and a motion-transmitting means consisting of a pair of opposed, counterbalanced, coaxially pivoted rockers, said rockers being disposed in said housing to be engaged by said movable walls and actuated by movement thereof to operate said current-controlling means.

14. A fluid pressure transducer comprising: a housing; a set of movable walls disposed in said housing and cooperating therewith to define a pair of fluid pressure chambers at opposite sides of a reference pressure chamber; a passage means to establish communication between said fluid pressure chambers and a source of fluid pressure to be measured; an electrical, variable resistance means for producing a signal; and a motion-transmitting means consisting of a pair of opposed, counterbalanced, coaxially pivoted rockers, said rockers being disposed in said housing to be engaged by said movable walls and actuated by movement thereof to operate said electrical, variable resistance means.

15. A fluid pressure transducer comprising: a housing; a set of movable walls disposed in said housing and cooperating therewith to define a pair of fluid pressure chambers at opposite sides of a reference pressure chamber; a passage means to establish communication between said fluid pressure chambers and a source of fluid pressure to be measured; a potentiometer means for producing a signal; and a motion-transmitting means consisting of a pair of opposed, counterbalanced, coaxially pivoted rockers, said rockers being disposed in said housing to be engaged by said movable walls and actuated by movement thereof to operate said potentiometer means.

References Cited in the file of this patent

UNITED STATES PATENTS

| | | |
|---|---|---|
| 2,384,894 | Curtis | Sept. 18, 1945 |
| 2,466,071 | Barnes et al. | Apr. 5, 1949 |
| 2,622,177 | Klose | Dec. 16, 1952 |
| 2,841,674 | Bourns et al. | July 1, 1958 |

UNITED STATES PATENT OFFICE

CERTIFICATE OF CORRECTION

Patent No. 2,946,031

July 19, 1960

Harry M. Steele, Jr.

It is hereby certified that error appears in the printed specification of the above numbered patent requiring correction and that the said Letters Patent should read as corrected below.

Column 1, line 43, for "eelvation" read -- elevation --; column 3, line 4, for "bearing" read -- bearings --; column 4, line 13, for "diaphragm" read -- diaphragms --; line 52, for "egnagement" read -- engagement --; column 5, line 55, for "fo" read -- of --; line 61, for "measure" read -- measured --.

Signed and sealed this 3rd day of January 1961.

(SEAL)
Attest:

KARL H. AXLINE
Attesting Officer

ROBERT C. WATSON
Commissioner of Patents